United States Patent [19]

Netter

[11] Patent Number: 5,288,668
[45] Date of Patent: Feb. 22, 1994

[54] GLASSES MADE OF PINK BOROSILICATES, THEIR MANUFACTURE, AND ARTICLES MADE OF SUCH GLASSES

[75] Inventor: Paul L. Netter, Paris, France

[73] Assignee: Corning Incorporated, Corning, N.Y.

[21] Appl. No.: 103,214

[22] Filed: Aug. 9, 1993

[30] Foreign Application Priority Data

Sep. 14, 1992 [FR] France ............................... 92 10906

[51] Int. Cl.$^5$ ............................................... C03C 3/091
[52] U.S. Cl. ........................................ 501/66; 501/65; 501/72
[58] Field of Search .................. 501/66, 65, 72

[56] References Cited

U.S. PATENT DOCUMENTS

| | | | |
|---|---|---|---|
| 3,468,745 | 9/1969 | Navez et al. | 501/66 |
| 4,116,704 | 9/1978 | Boyd et al. | 501/66 |
| 4,379,851 | 4/1983 | Danielson et al. | 501/66 |
| 4,762,809 | 8/1988 | Imai | 501/66 |
| 5,242,869 | 9/1993 | Tarumi et al. | 501/56 |

FOREIGN PATENT DOCUMENTS 547091 2/1922 France .

*Primary Examiner*—Mark L. Bell
*Assistant Examiner*—Deborah Jones
*Attorney, Agent, or Firm*—Clinton S. Janes, Jr.

[57] ABSTRACT

This invention is directed to the production of borosilicate glasses displaying a pink coloration and a chromaticity at a thickness of 4 mm with Illuminant C within the ranges of:

x=0.3115–0.4200
y=0.3170–0.3600
Y=15–92%

The glasses consist essentially, expressed in terms of weight percent on the oxide basis, of

| | |
|---|---|
| $SiO_2$ | 65–85 |
| $B_2O_3$ | <20 |
| $Na_2O$ | 0–8 |
| $K_2O$ | 0–8 |
| $Na_2O + K_2O$ | 2–8 |
| $Al_2O_3$ | 1–6 |
| $MnO_2$ | 0.05–1. |

4 Claims, No Drawings

GLASSES MADE OF PINK BOROSILICATES, THEIR MANUFACTURE, AND ARTICLES MADE OF SUCH GLASSES

BACKGROUND OF THE INVENTION

The present invention relates to pink borosilicate glasses, a method for their manufacture, and the articles formed from such glasses.

Borosilicate glasses, such as Pyrex ® glass, have been known for a long time and are widely used for the manufacture of cooking articles that are oven-resistant. Indeed, their low coefficient of expansion gives them a good resistance to thermal shock, which is improved even further by the thermal tempering that is generally applied to them. The borosilicate glasses used for cooking are for the most part manufactured without the addition of any coloring agent, and therefore have a slightly yellow or yellow-green color due to the inevitable iron impurities. Certain borosilicate glasses are colored light blue by a few ppm of cobalt. The appearance of articles of colored borosilicate glass is recent. Up to the present it has involved only brown glasses such as those which are described in U.S. Pat. No. 4,116,704.

Different colors have been tested during consumer polls and it appeared that the pink color received many votes.

It is known that the addition of a manganese oxide, such as $MnO_2$, to certain glass batches imparts to them a pink color which can be attributed to the presence of $Mn^{3+}$ ions in the glass. However, it is also known, according to FR A 547,091 filed on Feb. 11, 1922, that in the case of borosilicate glasses, the manganese dioxide does not produce a pink color, but instead a color ranging from yellow to maroon. To the knowledge of the applicant, this teaching has not been contradicted up to the present, even though it is older than 70 years.

Other coloring agents have indeed been proposed, such as selenium, gold, or erbium oxide, in order to color borosilicate glasses pink, but these coloring agents, either because of cost or because of difficult implementation, are ill-suited for the large scale production of borosilicate glass articles, such as Pyrex ®, of a pink coloring.

There is currently the need for a pink-colored borosilicate glass that is not expensive and is easy to manufacture.

SUMMARY OF THE INVENTION

The applicant, with the view of satisfying this need, has undertaken intensive research and has found, very surprisingly, that it was possible to produce a pink borosilicate glass by incorporating a manganese compound into the vitrifiable batch, provided that the glass is prepared under oxidizing conditions and that the manganese content is kept between certain limits.

More particularly, the present invention relates to a pink-colored borosilicate glass whose composition comprises, in weight percent based on the oxides, 65-85% of $SiO_2$, more than 10% of $B_2O_3$, but less than 20%, 0-8% $Na_2O$, 0-8% $K_2O$, a total proportion of $Na_2O$ and $K_2O$ of 2-8%, and 1-6% of $Al_2O_3$, and having a linear coefficient of thermal expansion between 20°-300° C. of $30-55 \times 10^{-7}/C$, characterized in that it contains, in addition, 0.05-1.00 weight percent of manganese, calculated in the form of $MnO_2$, and in that the glass has a degree of oxidation such that it exhibits a chromaticity, at a thickness of 4 mm and for Illuminant C, coming within the following ranges:

x=0.3115-0.4200
y=0.3170-0.3600
Y=15-92%.

Up to about 8% total of compatible metal oxides, such as the alkaline earth metal oxides, may be included in individual amounts not exceeding about 5%.

Preferably, the base glass compositions of the present invention consist essentially, expressed in terms of weight percent on the oxide basis of 75-85% $SiO_2$, more than 10% $B_2O_3$, but less than 16%, 0-7% $Na_2O$, 0-7% $K_2O$, a total proportion of $Na_2O$ and $K_2O$ of 2-7%, and 1-5% $Al_2O_3$, characterized in that it contains, in addition, 0.15-0.30 weight percent of manganese, calculated in the form of $MnO_2$, and its chromaticity, at a thickness of 4 mm and for the Illuminant C, comes within the following ranges:

x=0.3120-0.3400
y=0.3180-0.3400
Y=60-88%.

Up to 5% total of compatible metal oxides, such as the alkaline earth metal oxides, may be included in individual amounts not exceeding about 3%.

The invention also relates to the articles formed from a glass made according to the invention, in particular, articles used for the cooking of foods, such as oven plates, cookers, covers for casseroles, stew pots, frying pans, and plates, and similar articles, whether or not these articles have undergone a tempering intended to improve their resistance to thermal shock. These articles can be manufactured by techniques routinely used for borosilicate glasses and which do not need to be described here.

Finally, the invention relates to a method for the production of a pink borosilicate glass comprising: (a) preparing a vitrifiable batch having the composition consisting essentially, expressed in weight percent based on the oxides, of 65-85% of $SiO_2$, more than 10% of $B_2O_3$, but less than 20%, 0-8% $Na_2O$, 0-8% $K_2O$, a total proportion of $Na_2O$ and $K_2O$ of 2-8%, and 1-6% of $Al_2O_3$, with up to 8% total of compatible metal oxides, such as the alkaline earth metal oxides, optionally included in individual amounts not exceeding about 5%; (b) melting this batch; (c) shaping this melt into a glass article; (d) annealing this glass article; and (e) optionally tempering this glass article; characterized in that one incorporates in the vitrifiable batch a manganese compound corresponding to a content of $MnO_2$, calculated in the form of manganese dioxide, $MnO_2$ of 0.05-1 weight percent, preferably 0.15-0.30 weight percent, and in that the melting of the vitrifiable batch is conducted under oxidizing conditions so as to impart to the glass a chromaticity as defined above with reference to the glass of the invention.

The preferred glasses of the subject invention can also be prepared in accordance with the method described above.

The present invention is based on the discovery of a pink borosilicate glass exhibiting the above-mentioned trichromatic coordinates that can be obtained, contrary to the teachings of the prior art: (i) if one adjusts the quantity of Mn, calculated in the form of $MnO_2$, present in the glass to between 0.05 and 1 weight percent; and (ii) if one carries out the preparation of the glass under conditions such that the glass obtained is oxidized to a proper degree in order to assure the formation of $Mn^{3+}$ ions conferring a pink color to the glass. Below 0.05% of Mn, the coloring is too weak, while above 1% of Mn, the resulting coloring turns toward dark brown and is aesthetically not attractive.

The glass must be at an appropriate degree of oxidation so that a sufficient part of the manganese contained in the glass is present in the form of $Mn^{3+}$ ions, which alone impart a pink coloring to the glass. When the glass is not in the oxidized state or is at a degree of oxidation too low, the manganese is present in the form of $Mn^{2+}$ ions and the color of the glass obtained goes to yellow to brown as a function of the Mn content.

Conversely, accordingly, with a manganese content coming within the specified ranges, one can obtain a pink coloring signifying that the glass is at an appropriate degree of oxidation.

In practice, a means of assuring the obtention of the appropriate degree of oxidation consists in the careful selection of the raw materials constituting the starting vitrifiable batch, so as to include at least one raw material with oxidizing properties, as well as minimizing the reducing character of the raw materials that are normally reducing.

The manganese can be introduced in the form of any compound compatible with the glass melting techniques; that is, one that does not cause an explosion or excessive corrosion of the equipment, or any other harmful effect that would compromise the proper operation or economy of the procedure. For example, the manganese can be introduced in the form of manganese dioxide. Preferably, it is introduced, at least partially, in the form of a permanganate that facilitates the obtention of the desired pink coloring because of its oxidizing action. Potassium permanganate is an oxidizing agent that is widely used in an aqueous solution, but its use in the glass industry is unusual. Incidentally, it should be noted that the pink coloring of the glasses of the invention is not at all due to the $MnO_4-(Mn^{7+})$ ions.

It is also possible to incorporate in the starting vitrifiable batch as a source of alkali metal oxides, nitrates of sodium or potassium which exhibit oxidizing properties.

With regard to the normally reducing raw materials as the sand used as the silica source, one advantageously chooses a sand exhibiting a low loss of firing to 1000° C., and thus a low content of organic matter, among the various qualities of sand available on the market. The loss due to firing at 1000° C. is one measure of the reducing power of a mineral material. As an indication, one prefers a sand having a loss on firing to 1000° C. of less than 0.1 weight percent, although a sand having a loss in firing of 0.1 weight percent can nevertheless be used if its reducing effect is compensated by the presence of oxidizing ingredients in sufficient proportions.

The other raw materials used are those currently employed in the glass industry.

To promote the obtention of oxidizing conditions, it is also possible to conduct the melting of the vitrifiable batch under an oxidizing atmosphere (oxygen or oxygen-enriched air).

DESCRIPTION OF PREFERRED EMBODIMENTS

The following non-limiting examples are given with the object to illustrate the invention.

In these examples, the glasses were prepared by means of the following general mode of operation:

In platinum crucibles at 1600° C. one melts batches of conventional borosilicate glasses made from the various raw materials normally used for such glasses, along with a coloring raw material containing manganese. The molten batches are cast into plates of a thickness of 8 mm which are annealed, then core drilled and polished into samples with a thickness of 4 mm. For each glass, one of the samples was subjected to thermal tempering by heating to 800° C., followed by a quick cooling by the blowing of air.

The trichromatic coordinates of an annealed sample and a tempered sample of each glass were measured and it was ascertained that the tempering had a certain influence on the color, primarily causing a variation in the coordinate Y of the trichromatic coordinates according to the following equation:

$$Y \text{ (after tempering)} = Y \text{ (after annealing)} - 1\text{-}2\%$$

EXAMPLES 1 to 12

The following table recapitulates the compositions of the glasses, in weight percent based on the oxides, with the glass of Example 5 being outside of the invention; the raw materials used, the color obtained and the trichromatic coordinates of the glasses after tempering.

TABLE

| Analysis (wt %) | Example 1 | Example 2 | Example 3 | Example 4 | Example 5* | Example 6 |
|---|---|---|---|---|---|---|
| $SiO_2$ | 78.46 | 78.42 | 78.74 | 78.51 | 75.77 | 76.79 |
| $Al_2O_3$ | 2.45 | 2.42 | 2.46 | 2.44 | 2.59 | 2.59 |
| $Na_2O$ | 4.63 | 4.63 | 4.54 | 4.62 | 4.42 | 4.46 |
| $K_2O$ | 0.63 | 0.61 | 0.52 | 0.62 | 1.61 | 1.56 |
| $B_2O_3$ | 13.5 | 13.6 | 13.4 | 13.5 | 13.6 | 13.5 |
| $Fe_2O_3$ | 0.0308 | 0.0233 | 0.0200 | 0.0203 | 0.0224 | 0.0208 |
| Cl | 0.095 | 0.092 | 0.087 | 0.064 | 0.123 | 0.110 |
| $MnO_2$ | 0.203 | 0.202 | 0.229 | 0.229 | 1.86 | 0.97 |
| Raw Materials | | | | | | |
| For silica | sand S | sand C | sand C | sand C | sand C | sand C |
| For manganese | $MnO_2$ | $MnO_2$ | $KMnO_4$ | $KMnO_4$ | $KMnO_4$ | $KMnO_4$ |
| Colors by Visual Inspection | pink very light | pink light | pink | pink | pink very dark brown | pink very dark |
| x | 0.3133 | 0.3157 | 0.3204 | 0.3252 | 0.5290 | 0.4093 |
| y | 0.3187 | 0.3195 | 0.3214 | 0.3229 | 0.3503 | 0.3401 |
| Y | 89.0 | 85.3 | 81.3 | 75.1 | 5.0 | 23.1 |

| Analysis (wt %) | Example 7 | Example 8 | Example 9 | Example 10 | Example 11 | Example 12 |
|---|---|---|---|---|---|---|
| $SiO_2$ | 78.33 | 78.48 | 70.50 | 69.98 | 70.69 | 69.33 |
| $Al_2O_3$ | 2.42 | 2.40 | 4.34 | 4.41 | 4.71 | 4.39 |
| $Na_2O$ | 4.75 | 4.73 | 7.46 | 7.96 | 8.54 | 7.52 |
| $K_2O$ | 0.67 | 0.66 | 0.111 | 0.082 | 0.112 | 0.534 |
| $B_2O_3$ | 13.5 | 13.4 | 13.6 | 13.5 | 13.5 | 13.6 |

TABLE-continued

|  | | | | | | |
|---|---|---|---|---|---|---|
| BaO |  |  | 2.29 | 2.30 | 1.23 | 2.24 |
| CaO |  |  | 1.29 | 1.3 | 0.692 | 1.29 |
| Fe$_2$O$_3$ | 0.0189 | 0.0144 | 0.009 | 0.032 | 0.010 | 0.026 |
| Cl | 0.105 | 0.100 |  |  |  |  |
| As$_2$O$_3$ |  |  | 0.144 | 0.144 | 0.167 | 0.128 |
| Sb$_2$O$_3$ |  |  | 0.139 | 0.142 | 0.156 | 0.136 |
| MnO$_2$ | 0.205 | 0.220 | 0.163 | 0.154 | 0.189 | 0.803 |
| Raw Materials |  |  |  |  |  |  |
| For silica | sand SN | sand SN | sand SN | sand S | sand SN | sand S |
| For manganese | KMnO$_4$ | KMnO$_4$ | KMnO$_4$ | MnO$_2$ | KMnO$_4$ | KMnO$_4$ |
| Colors by Visual Inspection | pink very light | pink | pink light | pink very light | pink light | pink |
| x | 0.3117 | 0.3164 | 0.3140 | 0.3138 | 0.3145 | 0.3287 |
| y | 0.3174 | 0.3191 | 0.3184 | 0.3192 | 0.3186 | 0.3275 |
| Y | 89.1 | 83.2 | 87.4 | 87.7 | 87.1 | 74.6 |

*Outside the scope of the invention
Note: All of the glasses of Examples 1 to 12 typically contain, as impurities, approximately 200 ppm (parts per million) of Fe$_2$O$_3$ and approximately 20 ppm of NiO.

Currently, the glasses of Examples 3, 4 and 8 are preferred.

The sands S and SN used as raw materials had the following analyses, in weight percent, as given by the suppliers:

|  | sand S | sand SN |
|---|---|---|
| SiO$_2$ | 99.60 | 99.80 |
| Fe$_2$O$_3$ | 0.016 | 0.008 |
| Al$_2$O$_3$ | 0.175 | 0.040 |
| TiO$_2$ | 0.030 | 0.018 |
| K$_2$O + Na$_2$O | 0.2 | 0.01 |
| CaO + MgO | 0.04 | 0.01 |
| Cr$_2$O$_3$ | 1 ppm | 1.2 ppm |
| Loss on Firing to 1000° C. | 0.1 | 0.05 |

The analysis of sand C is not known, but its loss upon firing is thought to be intermediate between those of sands S and SN.

The loss on firing to 1000° C. is a measure of the reducing power of the sand.

Naturally, the described embodiments are only examples and one could change them, notably by substitution of technical equivalents, without leaving the scope of the invention.

What is claimed is:

1. A borosilicate glass of a pink color consisting essentially, in weight percent based on the oxides, of 65-85% SiO$_2$, more than 10% but less than 20% B$_2$O$_3$, 0-8% Na$_2$O, 0-8% K$_2$O, a total proportion of Na$_2$O and K$_2$O of 2-8%, 1-6% Al$_2$O$_3$, and 0.05-1.00% manganese calculated as MnO$_2$, said glass having a linear coefficient of thermal expansion between 20° and 300° C. of between 30 and 55 X $10^{-7}$/C, and wherein said glass has a degree of oxidation such that it exhibits a chromaticity, at a thickness of 4 mm and for the Illuminant C, within the following ranges:

x = 0.3115 to 0.4200
y = 0.3170 to 0.3600
z = 15 to 92%.

2. A glass according to claim 1, consisting essentially of 75-85% SiO$_2$, more than 10% B$_2$O$_3$, but less than 16%, 0-7% Na$_2$O, 0-7% K$_2$O, a total proportion of Na$_2$O and K$_2$O of 2-7%, and 1-5% Al$_2$O$_3$, and 0.15-0.30 weight percent of manganese, calculated in the form of MnO$_2$, wherein said glass exhibits a chromaticity, at a thickness of 4 mm and for the Illuminant C, of between the following ranges:

x = 0.3120 to 0.3400
y = 0.3180 to 0.3400
Y = 60 to 88%.

3. A glass article exhibiting a ink color consisting essentially of a borosilicate glass consisting essentially, in weight percent based on the oxides, of 65-85% SiO$_2$, more than 10% but less than 20% B$_2$O$_3$, 0-8% Na$_2$O, 0-8% K$_2$O, a total proportion of Na$_2$O and K$_2$O of 2-8%, 1-6% Al$_2$O$_3$, and 0.05-1,00% manganese calculated as MnO$_2$, said glass having a linear coefficient of thermal expansion between 20° and 300° C. of between 30 and 55 X $10^{-7}$/C, and wherein said glass has a degree of oxidation such that it exhibits a chromaticity, at a thickness of 4 mm and for the Illuminant C, within the following ranges:

x = 0.3115 to 0.4200
y = 0.3170 to 0.3600
z = 15 to 92%.

4. A glass article according to claim 3 consisting essentially of 75-85% SiO$_2$, more than 10% B$_2$O$_3$, but less than 16%, 0-7% Na$_2$O, 0-7% K$_2$O, a total proportion of Na$_2$O and K$_2$O of 2-7%, and 1-5% Al$_2$O$_3$, and 0.15-0.30 weight percent of manganese, calculated in the form of MnO$_2$, wherein said glass exhibits a chromaticity, at a thickness of 4 mm and for the Illuminant C, of between the following ranges:

x = 0.3120 to 0.3400
y = 0.3180 to 0.3400
Y = 60 to 88%.

* * * * *